United States Patent [19]

Shalati et al.

[11] Patent Number: 4,946,744
[45] Date of Patent: Aug. 7, 1990

[54] SUBSTRATE COATED WITH A CLEARCOAT/BASECOAT COMPOSITION COMPRISING AN ANHYDRIDE-FUNCTIONAL COMPOUND AND AN HYDROXY-FUNCTIONAL COMPOUND

[75] Inventors: Mohamad D. Shalati, Richton Park; James A. Marquart, Chicago Heights; John R. Babjak, Tinley Park; Rodney M. Harris, Chicago, all of Ill.

[73] Assignee: The Sherwin-Williams Company, Cleveland, Ohio

[21] Appl. No.: 120,894

[22] Filed: Nov. 16, 1987

[51] Int. Cl.$^5$ .................. B32B 27/00; C08L 33/14
[52] U.S. Cl. .................. 428/500; 428/462; 428/463; 428/522; 428/425.1; 428/425.8; 428/425.6; 428/423.1; 428/413; 428/418; 525/207; 525/223
[58] Field of Search ............ 428/516, 500, 462, 463, 428/522

[56] References Cited

U.S. PATENT DOCUMENTS

| | | | |
|---|---|---|---|
| 3,624,180 | 11/1971 | Schmid et al. | 260/835 |
| 3,639,345 | 1/1972 | Whittemore et al. | 260/47 |
| 3,897,514 | 7/1975 | Allabashi | 260/836 |
| 3,925,507 | 12/1975 | Katsimbas | 260/836 |
| 3,932,367 | 1/1976 | Labana et al. | 260/78.4 |
| 3,953,644 | 4/1976 | Camelon et al. | 428/220 |
| 3,954,712 | 5/1976 | Lottanti et al. | 260/47 |
| 3,975,314 | 8/1976 | Smyk et al. | 260/2 |
| 3,978,026 | 3/1976 | Katzakian, Jr. et al. | 260/47 |
| 3,979,477 | 9/1976 | Schmid et al. | 260/835 |
| 4,046,727 | 9/1977 | Iroh et al. | 260/28.5 |
| 4,069,275 | 1/1978 | Labana et al. | 260/836 |
| 4,076,674 | 9/1978 | Koleske et al. | 260/29.4 |
| 4,086,293 | 4/1978 | Smith et al. | 260/830 |
| 4,086,294 | 4/1978 | Koleske et al. | 260/834 |
| 4,176,143 | 11/1979 | Kraft et al. | 260/835 |
| 4,261,871 | 4/1981 | Smith et al. | 260/18 |
| 4,322,325 | 3/1982 | Esser et al. | 523/457 |
| 4,327,200 | 4/1982 | Leitner et al. | 525/531 |
| 4,346,144 | 8/1982 | Craven | 428/335 |
| 4,391,965 | 7/1983 | Falkenburg et al. | 528/112 |
| 4,403,091 | 9/1983 | Hartman et al. | 528/288 |
| 4,403,093 | 9/1983 | Hartman et al. | 528/297 |
| 4,415,697 | 11/1983 | Peng et al. | 524/512 |
| 4,452,948 | 6/1984 | Marrion et al. | 525/207 |
| 4,507,411 | 3/1985 | Gordon et al. | 523/436 |
| 4,511,682 | 4/1985 | Mayer et al. | 523/402 |
| 4,620,994 | 11/1986 | Suss et al. | 427/407.1 |
| 4,650,718 | 3/1987 | Simpson et al. | 428/413 |
| 4,681,811 | 7/1987 | Simpson et al. | 428/413 |
| 4,703,101 | 10/1987 | Singer et al. | 528/87 |
| 4,732,790 | 3/1988 | Blackburn et al. | 427/407 |
| 4,732,791 | 3/1988 | Blackburn et al. | 427/407 |
| 4,798,745 | 1/1989 | Martz et al. | 427/407.1 |
| 4,798,746 | 1/1989 | Clarr et al. | 427/407.1 |

FOREIGN PATENT DOCUMENTS

| | | |
|---|---|---|
| 0123793 | 2/1984 | European Pat. Off. . |
| 0134691 | 7/1984 | European Pat. Off. . |
| WO84/00768 | 3/1984 | PCT Int'l Appl. . |
| WO84/00770 | 3/1984 | PCT Int'l Appl. . |
| WO84/00771 | 3/1984 | PCT Int'l Appl. . |
| WO87/02044 | 7/1987 | PCT Int'l Appl. . |
| 0994907 | 6/1965 | United Kingdom . |
| 1583316 | 1/1981 | United Kingdom . |

OTHER PUBLICATIONS

AC-32 Dianhydride, Bulletin from Anhydrides and Chemicals Incorporated.

Primary Examiner—P. C. Ives
Attorney, Agent, or Firm—Robert E. McDonald

[57] ABSTRACT

A substrate coated with a multi-layer decorative and/or protective coating which comprises:
(a) a basecoat comprising a pigmented film-forming polymer; and
(b) a transparent clearcoat comprising a film-forming polymer applied to the surface of the basecoat composition;

the improvement which comprises utilizing as the clearcoat a multicomponent curable composition which is reactive upon mixing of the components, wherein the curable composition comprises:
(i) an anhydride-functional compound having an average of at least two cyclic carboxylic acid anhydride groups per molecule; and
(ii) a hydroxy-functional compound havng an average of at least two hydroxyl groups per molecule;

wherein at least one of the compounds (i) or (ii) comprises a film forming polymer.

28 Claims, No Drawings

SUBSTRATE COATED WITH A CLEARCOAT/BASECOAT COMPOSITION COMPRISING AN ANHYDRIDE-FUNCTIONAL COMPOUND AND AN HYDROXY-FUNCTIONAL COMPOUND

BACKGROUND OF THE INVENTION

1. Field of the Invention.

This invention relates to novel reactive coatings which can be cured at room temperature or force dried at temperatures ranging up to about 350° F. The coatings may be utilized as clearcoats and/or basecoats in clearcoat/basecoat compositions. The combination of anhydride-functional compounds and hydroxy-functional compounds provides fast reacting, durable coatings which minimize the toxicity problems which may be associated with other low temperature curing systems.

2. Description of the Prior Art.

One common prior art approach to high performance low temperature curing coatings has involved two-component coatings comprising reactive isocyanates and active hydrogen-containing compounds such as hydroxyl-containing polymers or amine-containing polymers to produce polyurethane or polyurea coatings Although these materials have excellent performance and cure at low temperatures, the isocyanates may, under some conditions, be relatively hazardous to handle.

Coating compositions comprising reactive combinations of cyclic anhydrides and hydroxy-functional compounds are known in the art. The prior art has not, however, taught the combination of anhydride-functional compounds and hydroxy-functional compounds to provide low temperature curing clearcoat/basecoat coatings having excellent durability and performance.

BRIEF SUMMARY OF THE INVENTION

This invention relates to a substrate coated with a multi-layer decorative and/or protective coating which comprises:

(a) a basecoat comprising a pigmented film-forming polymer; and (b) a transparent clearcoat comprising a film-forming polymer applied to the surface of the basecoat composition; wherein the basecoat and/or the clearcoat comprises a multi-component curable composition which is reactive upon mixing of the components, and wherein the curable composition comprises:

(i) an anhydride-functional compound having an average of at least two cyclic carboxylic acid anhydride groups per molecule; and (ii) a hydroxy-functional compound having an average of at least two hydroxyl groups per molecule;

wherein at least one of the compounds (i), or (ii) comprises a film forming polymer. The term "compound" is used in its broadest sense to include monomers, oligomers and polymers. The term "film forming polymer" means any polymeric material that can form a film from evaporation of any carrier or solvent. The film-forming polymer may include a reactive crosslinker.

In its most preferred formulation, this invention relates to curable compositions wherein the anhydride-functional compound is the free radical addition polymerization product of at least one unsaturated monomer having anhydride functionality and at least one other ethylenically unsaturated monomer, and wherein the hydroxy-functional compound is the addition polymerization reaction product of at least one unsaturated monomer having hydroxy functionality and at least one other ethylenically unsaturated monomer.

It is especially preferred to utilize the curable composition of this invention in combination with about 5 to about 80% by weight of an inert solvent. It is convenient to provide the coating composition as a two-component system which is reactive upon mixing the components. In such a system, the anhydride-functional compound comprises one package and the hydroxy-functional compound provides a second package. The two packages can then be mixed together to provide the curable coatings immediately prior to application.

Accordingly, it is an object of this invention to provide improved curable compositions having excellent reactivity at low temperatures. It is a further object of this invention to provide coating compositions which may be utilized as clearcoats and/or basecoats in clearcoat/basecoat compositions. Another object of this invention is to provide an improved two-package coating composition wherein one package comprises an anhydride-functional compound and the other package comprises a hydroxy-functional compound. Another object of this invention is to provide coatings having excellent exterior durability and corrosion resistance. A further object of this invention is to provide improved coating compositions which can be cured at room temperature or force dried at elevated temperatures. These and other objects of the invention will become apparent from the following discussions.

DETAILED DESCRIPTION OF THE INVENTION

1. Hydroxy-Functional Compounds

The hydroxy-functional compounds which are useful in the practice of this invention have an average of at least two hydroxyl groups per molecule. Although low molecular weight diols and polyols such as propylene glycol, 1,6-hexanediol, triethanol amine, and pentaerythritol can be utilized in the practice of this invention, it is especially preferred to utilize polymeric hydroxy-functional compounds such as polyethers, polyesters, acrylics, polyurethanes, polycaprolactones, etc.

Preferably the hydroxy-functional polymer will have a number average molecular weight of at least about 400. Typical number average molecular weights will range from about 400 to about 30,000, and especially 1,000 to about 15,000. In order to provide the fastest rate of reaction during cure it is preferred in the practice of this invention to utilize hydroxy-functional compounds having predominantly, and preferably all, primary hydroxyl functionality.

Representative hydroxy-functional polymers include the hydroxy-functional polyethers, polyesters, acrylics, polyurethanes, polycaprolactones, etc., as generally described in Sections 1.1 through 1.5 below:

1.1 polyether polyols are well known in the art and are conveniently prepared by the reaction of a diol or polyol with the corresponding alkylene oxide These materials are commercially available and may be prepared by a known process such as, for example, the processes described in *Encyclopedia of Chemical Technology*, Volume 7, pages 257–262, published by Interscience publishers, Inc., 1951. Representative examples include the polypropylene ether glycols and polyethylene ether glycols such as those marketed as Niax ® Polyols from Union Carbide Corporation.

1.2. Another useful class of hydroxy-functional polymers are those prepared by condensation polymerization reaction techniques as are well known in the art. Representative condensation polymerization reactions include polyesters prepared by the condensation of polyhydric alcohols and polycarboxylic acids or anhydrides, with or without the inclusion of drying oil, semidrying oil, or non-drying oil fatty acids. By adjusting the stoichiometry of the alcohols and the acids while maintaining an excess of hydroxyl groups, hydroxy-functional polyesters can be readily produced to provide a wide range of desired molecular weights and performance characteristics.

The polyester polyols are derived from one or more aromatic and/or aliphatic polycarboxylic acids, the anhydrides thereof, and one or more aliphatic and/or aromatic polyols. The carboxylic acids include the saturated and unsaturated polycarboxylic acids and the derivatives thereof, such as maleic acid, fumaric acid, succinic acid, adipic acid, azelaic acid, and dicyclopentadiene dicarboxylic acid. The carboxylic acids also include the aromatic polycarboxylic acids, such as phthalic acid, isophthalic acid, terephthalic acid, etc. Anhydrides such as maleic anhydride, phthalic anhydride, trimellitic anhydride, or Nadic Methyl Anhydride (brand name for methylbicyclo[2.2.!]heptene-2,3-dicarboxylic anhydride isomers) can also be used.

Representative saturated and unsaturated polyols which can be reacted with the carboxylic acids to produce hydroxy-functional polyesters include diols such as ethylene glycol, dipropylene glycol, 2,2,4-trimethyl 1,3-pentanediol, neopentyl glycol, 1,2-propanediol, 1,4-butanediol, 1,3-butanediol, 2,3-butanediol, 1,5-pentanediol, 1,6-hexanediol, 2,2-dimethyl-1,3-propanediol, 1,4-cyclohexanedimethanol, 1,2-cyclohexanedimethanol, 1,3-cyclohexanedimethanol, 1,4-bis(2-hydroxyethoxy)cyclohexane, trimethylene glycol, tetramethylene glycol, pentamethylene glycol, hexamethylene glycol, decamethylene glycol, diethylene glycol, triethylene glycol, tetraethylene glycol, norbornylene glycol, 1,4-benzenedimethanol, 1,4-benzenediethanol, 2,4-dimethyl-2-ethylenehexane-1,3-diol, 2-butene-1,4-diol, and polyols such as trimethylolethane, trimethylolpropane, trimethylolhexane, triethylolpropane, 1,2,4-butanetriol, glycerol, pentaerythritol, dipentaerythritol, etc.

Typically, the reaction between the polyols and the polycarboxylic acids is conducted at about 120° C. to about 200° C. in the presence of an esterification catalyst such as dibutyl tin oxide.

1.3. Additionally, hydroxy-functional polymers can be prepared by the ring opening reaction of polyepoxides with primary or, preferably, secondary amines or polyamines to produce hydroxy-functional polymers. Representative amines and polyamines include ethanol amine, N-methylethanol amine, dimethyl amine, ethylene diamine, isophorone diamine, etc. Representative polyepoxides include those prepared by condensing a polyhydric alcohol or polyhydric phenol with an epihalohydrin, such as epichlorohydrin, usually under alkaline conditions. Some of these condensation products are available commercially under the designations EPON or DRH from Shell Chemical Company, and methods of preparation are representatively taught in U.S. Pat. Nos. 2,592,560; 2,582,985 and 2,694,694.

1.4. Other useful hydroxy-functional polymers can be prepared by the reaction of at least one polyol, such as those representatively described in Section 1.2 above, with polyisocyanates to produce hydroxy-functional urethanes. The polyols should, of course, be present at a level to provide an excess of hydroxyl groups over isocyanate groups. Representative polyisocyanates having two or more isocyanate groups per molecule include the aliphatic compounds such as ethylene, trimethylene, tetramethylene, pentamethylene, hexamethylene, 1,2-propylene, 1,2-butylene, 2,3-butylene, 1,3-butylene, ethylidene and butylidene diisocyanates; the cycloalkylene compounds such as 3-isocyanatomethyl-3,5,5-trimethylcyclohexylisocyanate, and the 1,3-cyclopentane, 1,3-cyclohexane, and 1,2-cyclohexane diisocyanates; the aromatic compounds such as m-phenylene, p-phenylene, 4,4'-diphenyl, 1,5-naphthalene and 1,4-naphthalene diisocyanates; the aliphatic-aromatic compounds such as 4,4'-diphenylene methane, 2,4- or 2,6-toluene, or mixtures thereof, 4,4'-toluidine, and 1,4-xylylene diisocyanates; the nuclear substituted aromatic compounds such as dianisidine diisocyanate, 4,4'-diphenylether diisocyanate and chlorodiphenylene diisocyanate; the triisocyanates such as triphenyl methane-4,4',4''-triisocyanate, 1,3,5-triisocyanate benzene and 2,4,6-triisocyanate toluene; and the tetraisocyanates such as 4,4'-diphenyl-dimethyl methane- 2,2'-5,5'-tetraisocyanate; the polymerized polyisocyanates such as tolylene diisocyanate dimers and trimers, and other various polyisocyanates containing biuret, urethane, and/or allophanate linkages.

1.5. Useful hydroxy-functional polymers can also be conveniently prepared by free radical polymerization techniques such as in the production of acrylic resins. The acrylic polymers are typically prepared by the addition polymerization of one or more monomers. At least one of the monomers will contain, or can be reacted to produce, a reactive hydroxyl group. Representative hydroxy-functional monomers include 2-hydroxyethyl acrylate, 2-hydroxyethyl methacrylate, 2-hydroxypropyl acrylate, 4-hydroxybutyl methacrylate, 2-hydroxypropyl methacrylate, 3-hydroxybutyl acrylate, 4-hydroxypentyl acrylate, 2-hydroxyethyl ethacrylate, 3-hydroxybutyl methacrylate, 2-hydroxyethyl chloroacrylate, diethylene glycol methacrylate, tetraethylene glycol acrylate, para-vinyl benzyl alcohol, etc. Typically the hydroxy-functional monomers would be copolymerized with one or more monomers having ethylenic unsaturation such as:

(i) esters of acrylic, methacrylic, crotonic, tiglic, or other unsaturated acids such as: methyl acrylate, ethyl acrylate, propyl acrylate, isopropyl acrylate, butyl acrylate, isobutyl acrylate, ethylhexyl acrylate, amyl acrylate, 3,5,5-trimethylhexyl acrylate, methyl methacrylate, ethyl methacrylate, propyl methacrylate, dimethylaminoethyl methacrylate, isobornyl methacrylate, ethyl tiglate, methyl crotonate, ethyl crotonate, etc.;

(ii) vinyl compounds such as vinyl acetate, vinyl propionate, vinyl butyrate, vinyl isobutyrate, vinyl benzoate, vinyl m-chlorobenzoate, vinyl p-methoxybenzoate, vinyl alpha-chloroacetate, vinyl toluene, vinyl chloride, etc.;

(iii) styrene-based materials such as styrene, alpha-methyl styrene, alpha-ethyl styrene, alpha-bromo styrene, 2,6-dichlorostyrene, etc.;

(iv) allyl compounds such as allyl chloride, allyl acetate, allyl benzoate, allyl methacrylate, etc.;

(v) other copolymerizable unsaturated monomers such as ethylene acrylonitrile, methacrylonitrile, dimethyl maleate, isopropenyl acetate, isopropenyl isobutyrate, acrylamide, methacrylamide, and dienes such as 1,3-butadiene, etc.

The polymers are conveniently prepared by conventional free radical addition polymerization techniques. Frequently, the polymerization will be initiated by conventional initiators known in the art to generate a free radical such as azobis(isobutyronitrile), cumene hydroperoxide, t-butyl perbenzoate, etc. Typically, the monomers are heated in the presence of the initiator at temperatures ranging from about 35° C. to about 200° C., and especially 75° C. to 150° C., to effect the polymerization The molecular weight of the polymer can be controlled, if desired, by the monomer selection, reaction temperature and time, and/or the use of chain transfer agents as is well known in the art.

Especially preferred in the practice of this invention are hydroxy-functional polyesters and hydroxy-functional free radical addition polymers. An especially preferred hydroxy-functional polymer is the addition polymerization reaction product of (a) 5 to 100, and especially 10 to about 40, weight percent of a hydroxy-functional ethylenically unsaturated monomer and (b) 0 to 95, and especially 60 to about 90, weight percent of at least one other ethylenically unsaturated monomer copolymerizable with the hydroxyfunctional monomer.

2. ANHYDRIDE-FUNCTIONAL COMPOUNDS

The anhydride-functional compounds which are useful in the practice of this invention can be any aliphatic or aromatic compound having at least two cyclic carboxylic acid anhydride groups in the molecule polymeric anhydrides having number average molecular weights between 500 and 7,000 are most useful. Especially preferred in the practice of this invention is the use of free radical addition polymers, such as acrylic polymers, having anhydride functionality. These are conveniently prepared as is well known in the art by polymerizing an unsaturated monomer having anhydride functionality, such as maleic anhydride, citraconic anhydride, itaconic anhydride, propenyl succinic anhydride, etc. with other ethylenically unsaturated monomers such as the esters of unsaturated acids, vinyl compounds, styrene-based materials, allyl compounds and other copolymerizable monomers, all as representatively taught in Section 1.5. of this specification and also may include, as polymerizable monomers, unsaturated acids.

For some applications, it is preferred to utilize an anhydride-functional polymer which has no free carboxylic acid groups on the anhydride-functional polymer. Surprisingly, however, the incorporation of relatively small amounts, e.g. less than about 15% of the total polymer weight, of an unsaturated monomer having free carboxylic acid groups, e.g. acrylic acid, methacrylic acid, tiglic acid, crotonic acid, maleic acid, etc., can provide improved color and extended stability and pot-life in certain formulations, especially those incorporating amines as catalysts. Therefore, one preferred approach to the formulation of the anhydride-functional compounds involves those prepared by the addition polymerization of at least one unsaturated monomer having anhydride functionality, at least one unsaturated monomer having free carboxylic acid functionality, and, optionally, at least one other ethylenically unsaturated copolymerizable monomer.

The monomers which are copolymerized with the unsaturated anhydride should, of course, be free of any functionality which could react with the anhydride group during the polymerization. The anhydride-functional addition polymers can be conveniently prepared by conventional free radical addition polymerization techniques. Typically the polymerization will be conducted in an inert solvent and in the presence of an initiator at temperatures ranging from 35° C. to about 200° C. An especially preferred anhydride-functional vehicle comprises the free radical addition polymerization product of (a) 5 to 40, and especially 15 to about 25, weight percent of an ethylenically unsaturated monoanhydride and (b) 60 to 95, and especially 75 to about 85, weight percent of at least one other ethylenically unsaturated monomer copolymerizable with the ethylenically unsaturated anhydride.

Another especially preferred anhydride-functional polymeric vehicle comprises the free radical addition product of:

(a) 5 to about 40, and especially 15 to about 25, weight percent of an ethylenically unsaturated monoanhydride monomer; and (b) 1 to about 15 weight percent of an ethylenically unsaturated carboxylic acid monomer copolymerizable with the ethylenically unsaturated monoanhydride; and (c) 45 to about 94 weight percent of at least one ethylenically unsaturated monomer which is copolymerizable with the ethylenically unsaturated monoanhydride and ethylenically unsaturated acid.

Surprisingly, it has been found that anhydride-functional polymers incorporating acrylate monomers, such as acrylic acid, butyl acrylate, etc. frequently provide a darker color polymer when used in combination with the preferred amine catalysts, e.g. imidazoles, of this invention than similar polymers using the corresponding methacrylate monomers such as methacrylic acid, butyl methacrylate, etc. Therefore, in those cases where color development may be critical it is preferred to minimize the amount of acrylate monomer, e.g. from 0 to not more than about 10 weight percent of the total monomer mixture. Especially preferred to minimize color development are anhydride-functional free radical addition polymers which are the polymerization product of monomers which are free of acrylate groups. These monomers may, of course, contain methacrylate functionality or other α-β-unsaturated carbonyl functionality where the α carbon is not directly bonded to a hydrogen atom.

Other polyanhydrides, in addition to the anhydride-functional addition polymerization products, can also be utilized in the practice of this invention. Ester anhydrides can be prepared, as is known in the art, by the reaction of e.g. trimellitic anhydride with polyols. Other representative, suitable polyanhydrides include poly-functional cyclic dianhydrides such as cyclopentane tetracarboxylic acid dianhydride, diphenyl-ether tetracarboxylic acid dianhydride, 1,2,3,4,-butane tetracarboxylic acid dianhydride, and the benzophenone tetracarboxylic dianhydrides such as 3,3',4,4'-benzophenone tetracarboxylic dianhydride, and 2,bromo-3,3',4,4'-benzophenone tetracarboxylic acid dianhydride. Trianhydrides such as the benzene and cyclohexene hexacarboxylic acid trianhydrides are also useful.

Additionally, useful polyanhydrides can be prepared by the maleinization of polyunsaturated compounds such as unsaturated rubbers, unsaturated oils and unsaturated hydrocarbons.

The ratios of anhydride to hydroxyl groups can be widely varied within the practice of this invention. It is especially preferred, however, to provide 0.3 to about 10 hydroxyl groups for each anhydride group in the reactive system. It is especially preferred to provide 1 to 5 hydroxyl groups for each anhydride group. At least one of the hydroxy-functional compound or the anhydride-functional compound should be a film forming polymer, and each of the compounds should be mutually soluble with the other compound.

The coatings of this invention can be cured at temperatures ranging from about room temperature up to about 350° F. The coatings can be used as clear coatings or they may contain pigments as is well known in the art. Representative opacifying pigments include white pigments such as titanium dioxide, zinc oxide, antimony oxide, etc. and organic or inorganic chromatic pigments such as iron oxide, carbon black, phthalocyanine blue, etc. The coatings may also contain extender pigments such as calcium carbonate, clay, silica, talc, etc.

The coatings may also contain other additives such as flow agents, catalysts, diluents, solvents, ultraviolet light absorbers, etc.

It is preferred in the practice of this invention to include a catalyst for the reaction of the anhydride and the hydroxyl groups. It is especially preferred in the practice of this invention to utilize tertiary amines and especially N-methylimidazole as a catalyst for the anhydride/hydroxyl reaction. The catalyst for the anhydride/hydroxyl reaction will typically be present at a level of at least 0.01% by weight of the anhydride compound, and preferably about 1.0 to about 5.0%.

The coatings of this invention may typically be applied to any substrate such metal, plastic, wood, glass, synthetic fibers, etc. by brushing, dipping, roll coating, flow coating, spraying or other method conventionally employed in the coating industry. If desired, the substrates may be primed prior to application of the coatings of this invention.

One preferred application of the curable coatings of this invention relates to their use as clearcoats and/or basecoats in clearcoat/basecoat formulations.

Clearcoat/basecoat systems are well known, especially in the automobile industry where it is especially useful to apply a pigmented basecoat, which may contain metallic pigments, to a substrate and allow it to form a polymer film followed by the application of a clearcoat which will not mix with or have any appreciable solvent attack upon the previously applied basecoat. The basecoat composition may be any of the polymers known to be useful in coating compositions including the reactive composition of this invention.

One useful polymer basecoat includes the acrylic addition polymers, particularly polymers or copolymers of one or more alkyl esters of acrylic acid or methacrylic acid, optionally together with one or more other ethylenically unsaturated monomers. These polymers may be of either the thermoplastic type or the thermosetting, crosslinking type which contain hydroxyl or amine or other reactive functionality which can be crosslinked. Suitable acrylic esters and unsaturated monomers for either type of polymer include methyl methacrylate, ethyl methacrylate, propyl methacrylate, butyl methacrylate, ethyl acrylate, butyl acrylate, vinyl acetate, acrylonitrile, acrylamide, styrene, vinyl chloride, etc. Where the polymers are required to be of the crosslinking type, suitable functional monomers which can be used in addition to those already mentioned include acrylic or methacrylic acid, hydroxy ethyl acrylate, 2-hydroxy propyl methacrylate, glycidyl acrylate, tertiary-butyl amino ethyl methacrylate, etc. The basecoat composition may, in such a case, also contain a crosslinking agent such as a polyisocyanate, a polyepoxide, or a nitrogen resin such as a condensate of an aldehyde such as formaldehyde with a nitrogeneous compound such as urea, melamine or benzoguanamine or a lower alkyl ether of such a condensate. Other polymers useful in the basecoat composition include vinyl copolymers such as copolymers of vinyl esters of inorganic or organic acids, such as vinyl chloride, vinyl acetate, vinyl propionate, etc., which copolymers may be optionally be partially hydrolyzed so as to introduce vinyl alcohol units.

Other polymers useful in the manufacture of the basecoat include alkyd resins or polyesters which can be prepared in a known manner by the condensation of polyhydric alcohols and polycarboxylic acids, with or without the inclusion of natural drying oil fatty acids as described elsewhere in this specification. The polyesters or alkyds may contain a proportion of free hydroxyl and/or carboxyl groups which are available for reaction, if desired with suitable crosslinking agents as discussed above.

If desired, the basecoat composition may also contain minor amounts of a cellulose ester, to alter the drying or viscosity characteristics of the basecoat.

Typically, the basecoat will include pigments conventionally used for coating compositions and after being applied to a substrate, which may or may not previously have been primed, the basecoat will be allowed sufficient time to form a polymer film which will not be lifted during the application of the clearcoat. The basecoat may be heated or merely allowed to air-dry to form the film. Generally, the basecoat will be allowed to dry for about 1 to 20 minutes before application of the clearcoat. The clearcoat is then applied to the surface of the basecoat, and the system can be allowed to dry at room temperature or, if desired, can be force dried by baking the coated substrate at temperatures typically ranging up to about 350° F.

Typically, the clearcoat may contain ultraviolet light absorbers such as hindered phenols or hindered amines at a level ranging up to about 6% by weight of the vehicle solids as is well known in the art. The clearcoat can be applied by any application method known in the art, but preferably will be spray applied. If desired, multiple layers of basecoat and/or clearcoat can be applied. Typically, both the basecoat and the clearcoat will each be applied to give a dry film thickness of about 0.01 to about 6, and especially about 0.5 to about 3.0 mils.

If desired, the novel reactive compositions taught herein could be used as a basecoat, in which case the clearcoat could also comprise the novel reactive coatings taught herein, or the polymers taught herein as being useful as basecoat formulations could be utilized as clearcoats.

The following examples have been selected to illustrate specific embodiments and practices of advantage to a more complete understanding of the invention. Unless otherwise stated, "parts" means parts-by weight and "percent" is percent-by-weight. The numeric ratings for solvent resistance (MEK rubs), wet adhesion, and salt spray are on a scale of 0-10, 10 best.

In each of the clearcoat/basecoat formulations described in Examples 5 through 9 the primer was G.B.P.® etching primer filler (2-component vinyl-butyral based primer commercially available from The Sherwin-Williams Company) and the basecoat was Acrylyd ® acrylic enamel (a lacquer-like coating commercially available from The Sherwin-Williams Company). The primer the basecoat and the clearcoat were applied to provide dry film thicknesses of approximately 1.0, 1.0 and 2.0 mils respectively.

The following examples have been selected to illustrate specific embodiments and practices of advantage to a more complete understanding of the invention. Unless otherwise stated "parts" means parts by weight and percent is percent by weight.

EXAMPLE 1

Hydroxy-Functional Polymer

A hydroxy-functional polymer was prepared by charging a polymerization reactor equipped with a mechanical stirrer, a water cooled condenser, nitrogen inlet, water trap, thermometer, heating mantle and fluid metering pump with 172.5 parts of n-butyl acetate. The reaction vessel was heated to approximately 237° F. and a monomer premix composed of 96.2 parts of methyl methacrylate, 63.0 parts of butyl acrylate, 58 parts of hydroxy ethyl methacrylate, 54 parts styrene and an initiator premixture composed of 11.5 parts of n-butyl acetate and 5.7 parts of Vazo 67 (trademark for E. I. duPont initiator believed to be 2,2'-azobis(2-methylbutyronitrile)) was metered simultaneously into the polymerization reactor at a constant rate over approximately 4 hours. The reaction temperature was maintained for an additional 2 hours after the addition was completed and cooled for one hour. The resulting hydroxy-functional polymer had a number average molecular weight of approximately 9,600.

EXAMPLE 2

Anhydride-Functional Acrylic Polymer

A reaction vessel equipped as in Example I was charged with 6,624 parts of xylene, 648 parts of maleic anhydride and heated to reflux under nitrogen. To this heated solution a monomer mixture of 5,616 parts butyl acrylate, 3,024 parts methylmethacrylate, 540 parts maleic anhydride and 270 parts of t-butyl peroctoate was metered into the reaction vessel at a constant rate over a 3-hour time period. At 1 hour and at 2 hours into the monomer addition, heating and monomer addition were stopped and the reactor was charged with 540 parts and 432 parts of maleic anhydride respectively. Heating was resumed to reflux and the monomer addition was continued. The reaction mixture was maintained at reflux temperature for an additional 15 minutes after the completion of all of the monomer addition. A solution of 54 parts of t butyl peroctoate in 576 parts xylene was added to the reaction over a 45-minute period. The reaction was held at reflux for an additional 2 hours and then allowed to cool to room temperature to obtain an anhydride-functional polymer having a number average molecular weight of about 1,800 and a free maleic anhydride content of less than 0.1%. This polymer had an average of about 3.6 anhydride groups per molecule.

EXAMPLE 3

Anhydride-Functional Polymer

A 4 neck, round bottomed flask equipped with mechanical stirrer, reflux condenser, thermometer, nitrogen inlet and fluid metering pump was charged with 1472 parts xylene, 240 parts maleic anhydride and heated to reflux (139° C.) under nitrogen. A monomer mixture of 480 parts isobutyl methacrylate, 720 parts butyl acrylate, 720 parts methyl methacrylate, 120 parts maleic anhydride and 60 parts t-butyl perbenzoate were then metered into the reaction over a 3-hour period. Halfway through the addition, an additional 120 parts of maleic anhydride was charged to the reaction vessel and monomer addition was continued. After refluxing the reaction mixture for an additional 15 minutes, 12 parts of t-butyl perbenzoate in 128 parts xylene were added over 45 minutes. Heating was continued for 2 hours at reflux. The resulting xylene soluble anhydride-functional resin was 61.2% solids, had a Gardner Holdt viscosity of 24.5, an acid value of 116.5, and a density of approximately 8.6 pounds per gallon.

EXAMPLE 4

Hydroxy-Functional Polymer

A polymerization reactor equipped with a mechanical stirrer, a water cooled condenser, nitrogen inlet, a Dean Stark water trap, a thermometer, a heating mantle and a fluid metering pump was charged with 4,000 parts of methyl amyl ketone and heated to reflux (approximately 147° C.) under nitrogen. To this heated solution a monomer mixture comprising 2,409 parts styrene, 1,204.2 parts butyl acrylate, 1,772.4 parts hydroxy ethyl acrylate, 613.8 parts Tone ™ M-100 (tradename of Union Carbide's hydroxy acrylic/ caprolactone adduct believed to be the reaction product of 1 mole of hydroxy ethyl acrylate and 2 moles of caprolactone) and 300 parts Vazo 67 is metered into the polymerization reactor at a constant over 3 hours. The reaction is held at reflux for an additional 15 minutes and vacuum stripped to 80% solids to obtain a hydroxy-functional resin having a number average molecular weight of 3,400 and a hydroxyl equivalent weight of 352.

EXAMPLE 5

Clear coating formulations intended primarily for use over a basecoat/primer system were prepared according to the following recipe:

| Raw Material | Parts |
| --- | --- |
| Hydroxyl-Functional Polymer of Example 1 | 482.35 |
| Anhydride-Functional Polymer of Example 3 | 130.43 |
| Xylene | 164.69 |
| BYK 300[1] | 2.50 |
| 20% N-methylimidazole/methyl isobutyl ketone | 13.92 |
| 20% Tinuvin 328[2]/Toluene | 23.48 |
| Tinuvin 292[3] | 2.82 |

[1]flow control agent sold by Byk-Malinkrodt
[2]trademark of Ciba-Geigy for 2-(2-hydroxy-3,5-diteritary amyl-phenol)-2H-benzotriazole
[3]trademark of Ciba-Geigy for di[4(2,2,6,6-tertramethyl piperdinyl)]sebacate This clear formulation represents approximately 3.0 hydroxyl groups per each anhydride group. The N-methylimidazole catalyst was present at 3.5% based upon the anhydride resin solids The coating was reduced with suitable solvents and spray applied over a primer/basecoat system on iron phosphate treated cold rolled steel. This coating system was allowed to ambient cure 24 hours before testing.

The resultant film exhibited a Konig Pendulum hardness of 13 after one day, 26 after one week, and 39 after four weeks. The coating exhibited a solvent resistance (MEK rubs) of 6 after one day and 8 after four weeks.

A 20° gloss reading of 82 and a distinctness of image reading of 67 was obtained. Salt spray resistance after 170 hours exposure to a 5% salt spray solution was excellent. A cross-hatch wet adhesion rating of 8 was obtained immediately after one week humidity cabinet exposure.

EXAMPLES 6-8

Clear coatings were prepared utilizing the formulation of Example 5 except that the anhydride-functional polymer of Example 3 was replaced with the anhydride-functional polymer of Example 2. The coating Examples 6-8 illustrate some of the effects of varying the equivalent ratios of the hydroxyl- and anhydride-functional polymers.

| EXAMPLE | 6 | 7 | 8 |
|---|---|---|---|
| Hydroxyl Equivalents | 0.800 | 0.500 | 0.650 |
| Anhydride Equivalents | 0.200 | 0.500 | 0.350 |
| Konig Pendulum Hardness 4 Weeks | 35 | 44 | 42 |
| MEK Rubs 4 Weeks | 6.5 | 6.5 | 7 |
| DFT (mils) | 4.4 | 4.3 | 4.3 |
| 20° Gloss | 84 | 80 | 84 |
| DOI | 75 | 54 | 59 |
| Humidity | | | |
| Initial 20° Gloss | 85 | 79 | 82 |
| Final 20° Gloss | 61 | 27 | 64 |
| % Retention | 72 | 34 | 78 |
| Wet Adhesion | 3 | 9 | 9 |
| Salt Spray/Scribe Corrosion | 7 | 5 | 8 |

EXAMPLE 9

The clear coating described in Example 5 was repeated except 50% of the solids of the hydroxy-functional polymer of Example 1 were replaced with the same amount of solids of the hydroxy-functional polymer of Example 4 as shown in the following recipe:

| Raw Materials | Parts |
|---|---|
| Hydroxy-Functional Polymer of Example 1 | 222.79 |
| Hydroxy-Functional Polymer of Example 4 | 169.72 |
| Anhydride-Functional Polymer of Example 2 | 164.42 |
| BYK 300 | 2.5 |
| 20% N-Methylimidazole/Methyl isobutyl ketone | 17.55 |
| 20% Tinuvin 328/Toluene | 23.37 |
| Tinuvin 292 | 2.80 |

This clear formulation represents 3.0 hydroxyl groups per each anhydride group. The N-methylimidazole catalyst was present at approximately 3.5% based upon the anhydride resin solids. The coating was reduced with suitable solvents and spray applied over a primer/basecoat system on iron phosphate treated cold rolled steel. The primer film thickness was approximately 1 mil dry; the basecoat approximately 1 mil dry; clear coat approximately 2 mils dry. This coating system was allowed to ambient cure approximately 24 hours before testing.

The resultant films exhibited a Konig Pendulum hardness reading of 32 after three days and 51 after one week. The coating exhibited a solvent resistance rating (MEK rubs) of 5 after one day and 7 after one week. A 20° gloss reading of 76 was obtained. A cross-hatch wet adhesion rating of 10 was obtained immediately after one week humidity cabinet exposure. Salt spray resistance was excellent after 170 hours exposure to 5% salt spray solution.

While this invention has been described by a specific number of embodiments, it is obvious that other variations and modifications may be made without departing from the spirit and scope of the invention as set forth in the appended claims.

The invention claimed is:

1. In a substrate coated with a multi-layer decorative and/or protective coating which comprises:
    (a) a basecoat comprising a pigmented film-forming polymer; and
    (b) a transparent clearcoat comprising a film-forming polymer applied to the surface of the basecoat composition;
the improvement which comprises utilizing as the clearcoat and/or the basecoat a multicomponent curable composition which is reactive upon mixing of the components, wherein the curable composition comprises:
    (i) an anhydride-functional compound having an average of at least two cyclic carboxylic acid anhydride groups per molecule; and
    (ii) a hydroxy-functional compound having an average of at least two- hydroxyl groups per molecule; wherein at least one of the compounds (i) or (ii) comprises a film forming polymer.

2. The coated substrate of claim 1 wherein the anhydride-functional compound is an anhydride functional polymer having a number average molecular weight of at least about 500.

3. The coated substrate of claim 2 wherein the anhydride-functional polymer is the addition polymerization reaction product of at least one unsaturated monomer having anhydride functionality.

4. The coated substrate of claim 3 wherein the anhydride-functional polymer is the addition polymerization reaction product of (a) 4 to 40 weight percent of an ethylenically unsaturated monoanhydride and (b) 60 to 95 weight percent of at least one other ehtylenically unsaturated monomer copolymerizable with the ethylenically unsaturated anhydride.

5. The coated substrate of claim 4 wherein the monoanhydride is maleic anhydride.

6. The coated substrate of claim 2 wherein the anhydride-functional polymer is free of carboxylic acid groups.

7. The coated substrate of claim 2 wherein the anhydride-functional polymer contains free carboxylic acid groups.

8. The coated substrate of claim 4 wherein the anhydride-functional polymer is the addition polymerization reaction product of (a) 5 to about 40 weight percent of an ethylenically unsaturated monoanhydride monomer; and (b) 1 to about 15 weight percent of an ethylenically unsaturated carboxylic acid monomer copolymerizable with the ethylenically unsaturated monoanhydride; and (c) 45 to about 94 weight percent of at least one ethylenically unsaturated monomer which is copolymerizable with the ethylenically unsaturated monoanhydride and ethylenically unsaturated acid.

9. The coated substrate of claim 1 wherein the hydroxy-functional compound is a hydroxy-functional polymer having a number average molecular weight of at least about 400.

10. The coated substrate of claim 9 wherein the hydroxy-functional polymer is selected from the group consisting of hydroxy-functional polyethers, polyesters, acrylic polymers, polyurethanes, and polycaprolactones.

11. The coated substrate of claim 10 wherein the hydroxy-functional polymer is the addition polymerization reaction product of (a) 10 to about 40 weight percent of a hydroxy-functional ethylenically unsaturated monomer and (b) 60 to about 90 weight percent of at least one ethylenically unsaturated monomer copolymerizable with the hydroxy-functional monomer.

12. The coated substrate of claim 1 wherein the curable composition also incorporates a catalyst for the reaction of anhydride and hydroxyl groups.

13. The coated substrate of claim 12 wherein the catalyst is a tertiary amine.

14. The coated substrate of claim 13 wherein the tertiary amine is N-methylimidazole.

15. The coated substrate of claim 1 wherein compounds (i) and (ii) are each present at a level to provide 0.3 to 10 hydroxy lgroups for each anhydride group.

16. The coated substrate of claim 15 wherein compounds (i) and (ii) are each present at a level to provide 1 to 5 hydroxy lgroups for each anhydride group.

17. In a substrate coated with a multi-layer decorative and/or protective coating which comprises:
 (a) a basecoat comprising a pigmented film-fomring polymer; and
 (b) a transparent clearcoat comprising a film-forming polymer applied to the surface of the basecoat composition;
the improvement which comprises utilizing as the clearcoat and/or the basecoat a multicomponent curable composition which is reactive upon mixing of the components, wherein the curable composition comprises:
 (i) an anhydride-functional polymer which is the addition polymerization reaction product of (a) 5 to 40 weight percent of an ethylenically unsaturated monoanhydride and (b) 60 to 95 weight percent of at least one other ethylenically unsaturated monomer copolymerizable with the ethylenically unsaturated anhydride; and
 (ii) a hydroxy-functional polymer which is the addition polymerization reaction product of (a) 10 to about 40 weight percent of a hydoxy-functional ethylenically unsaturated monomer and (b) 60 to about 90 weight percent of at least one ethylenically unsaturated monomer copolymerizable with the hydroxy-functional monomer.

18. The coated substrate of claim 17 wherein the anhydride-functional polymer is the addition polymerization reaction product of (a) 5 to about 40 weight percent of an ethylenically unsaturated monoanhydride monomer; and (b) 1 to about 15 weight percent of an ethylenically unsaturated carboxylic acid monomer copolymerizable with the ethylenically unsaturated monoanhydride; and (c) 45 to about 94 weight percent of at least one ethylenically unsaturated monomer which is copolymerizable with the ethylenically unsaturated monoanhydride and ethylenically unsaturated acid.

19. The coated substrate of claim 17 wherein the anhydride-functional polymer has a number average molecular weight of at least about 500.

20. The coated substrate of claim 17 wherien the monoanhydride is maleic anhydride.

21. The coated substrate of claim 17 wherein the anhydride-functional polymer is free of carboxylic acid groups.

22. The coated substrate of claim 17 wherein the anhydride-functional polymer contains free carboxylic acid groups.

23. The coated substrate of claim 17 wherein the hydroxy-functional polymer has a number average molecular weight of at least about 400.

24. The coated substrate of claim 17 wherein the curable composition also incorporates a catalyst for the reaction of anhydride and hydroxyl groups.

25. The coated substrate of claim 24 wherein the catalyst is a tertiary amine.

26. The coated substrate of claim 25 wherein the tertiary amine is N-methylimidazole.

27. The coated substrate of claim 17 wherein compounds (i) and (ii) are each present at a level to provide 0.3 to 10 hydroxyl groups for each anhydride group.

28. The coated substrate of claim 27 wherein compounds (i) and (ii) are each present at a level to provide 1 to 5 hydroxyl groups for each anhydride group.

* * * * *